(12) United States Patent
Uchiyama et al.

(10) Patent No.: US 8,665,520 B2
(45) Date of Patent: Mar. 4, 2014

(54) NEUTRAL DENSITY OPTICAL FILTER AND IMAGE PICKUP APPARATUS

(75) Inventors: Masayuki Uchiyama, Honjo (JP);
Munetoshi Yoshikawa, Chichibu (JP);
Kazuo Suzuki, Chichibu (JP); Takayuki Wakabayashi, Chichibu (JP)

(73) Assignee: Canon Denshi Kabushiki Kaisha, Saitama (JP)

( * ) Notice: Subject to any disclaimer, the term of this patent is extended or adjusted under 35 U.S.C. 154(b) by 1186 days.

(21) Appl. No.: 11/847,576

(22) Filed: Aug. 30, 2007

(65) Prior Publication Data

US 2008/0297932 A1   Dec. 4, 2008

(30) Foreign Application Priority Data

Aug. 30, 2006  (JP) ................... 2006-233039
Sep. 11, 2006  (JP) ................... 2006-245343
Sep. 22, 2006  (JP) ................... 2006-257198

(51) Int. Cl.
*G02B 1/10*  (2006.01)

(52) U.S. Cl.
USPC ............................ 359/580; 359/585; 359/888

(58) Field of Classification Search
USPC ............................ 359/580, 581, 589, 888–892
See application file for complete search history.

(56) References Cited

U.S. PATENT DOCUMENTS

| | | | |
|---|---|---|---|
| 5,715,103 A * | 2/1998 | Amano et al. | 359/888 |
| 6,842,302 B2 * | 1/2005 | Nakajima et al. | 359/888 |
| 6,866,431 B2 * | 3/2005 | Namazue et al. | 396/450 |
| 7,042,662 B2 | 5/2006 | Murata et al. | |
| 7,230,779 B2 * | 6/2007 | Kunii et al. | 359/888 |
| 2004/0008439 A1 * | 1/2004 | Nakajima et al. | 359/890 |
| 2004/0027479 A1 | 2/2004 | Ikeda | |
| 2004/0105646 A1 | 6/2004 | Fukuda et al. | |
| 2004/0135921 A1 * | 7/2004 | Murata et al. | 348/342 |
| 2005/0074579 A1 | 4/2005 | Suzuki et al. | |
| 2005/0208211 A1 * | 9/2005 | Edlinger et al. | 427/162 |
| 2006/0199040 A1 * | 9/2006 | Yamada et al. | 428/701 |
| 2007/0153408 A1 | 7/2007 | Yoshikawa et al. | |

FOREIGN PATENT DOCUMENTS

| | | |
|---|---|---|
| CN | 1383461 | 12/2002 |
| CN | 1484085 | 3/2004 |
| CN | 1504809 | 6/2004 |
| JP | 05-278157 | 10/1993 |
| JP | 6-265971 | 9/1994 |
| JP | 8-075902 | 3/1996 |
| JP | 9-220791 | 8/1997 |
| JP | 10-133253 | 5/1998 |
| JP | 2001-183506 | 7/2001 |
| JP | 2002-082205 A | 3/2002 |

(Continued)

*Primary Examiner* — Arnel C Lavarias
(74) *Attorney, Agent, or Firm* — Fitzpatrick, Cella, Harper & Scinto

(57) ABSTRACT

A spectral reflectance in the entire visible wavelength range may be decreased to decrease inconveniences in an image such as flare or ghost. A non-reflective periodic layer including a large number of fine uneven periodic structure bodies is formed on a substrate, and a neutral density ("ND") film is formed on the other surface of the substrate by vacuum deposition, to improve an anti-reflection function. Regarding a beam entering the ND filter, the $MgF_2$ film of the formed ND film suppresses the spectral reflectance at the boundary of the atmosphere and the ND film and at the boundary of the ND film and the substrate. The non-reflective periodic layer decreases the reflectance at the boundary of the substrate and the atmosphere.

6 Claims, 27 Drawing Sheets

(56) References Cited

FOREIGN PATENT DOCUMENTS

| | | |
|---|---|---|
| JP | 2002-258034 | 9/2002 |
| JP | 2002-267815 A | 9/2002 |
| JP | 2002-277612 A | 9/2002 |
| JP | 2003-222701 A | 8/2003 |
| JP | 2003-240903 A | 8/2003 |
| JP | 2003-240904 | 8/2003 |
| JP | 2003-344612 | 12/2003 |
| JP | 2004-012720 A | 1/2004 |
| JP | 2004-205951 | 7/2004 |
| JP | 2004-258494 | 9/2004 |
| JP | 2005-017986 A | 1/2005 |
| JP | 2005-215225 A | 8/2005 |
| JP | 2005-256119 A | 9/2005 |
| JP | 2006-078519 A | 3/2006 |
| WO | 02/079111 | 10/2002 |

* cited by examiner

F I G. 4
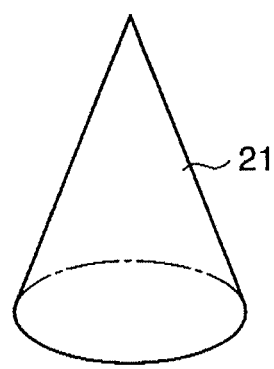

F I G. 5
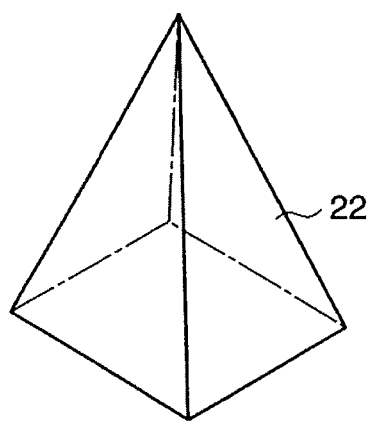

F I G. 19
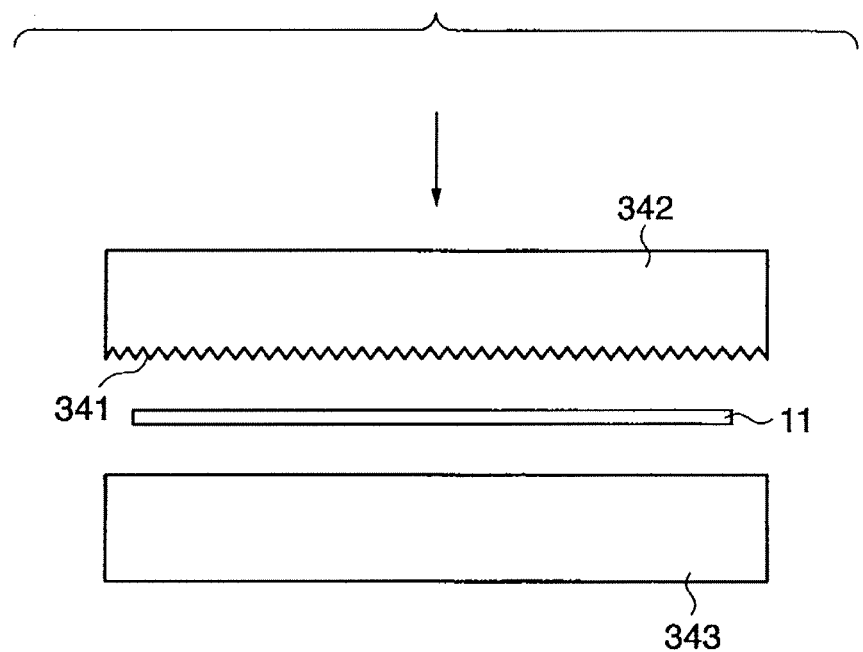

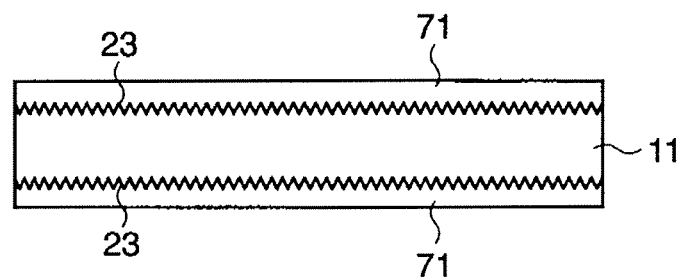
F I G. 23

F I G. 24
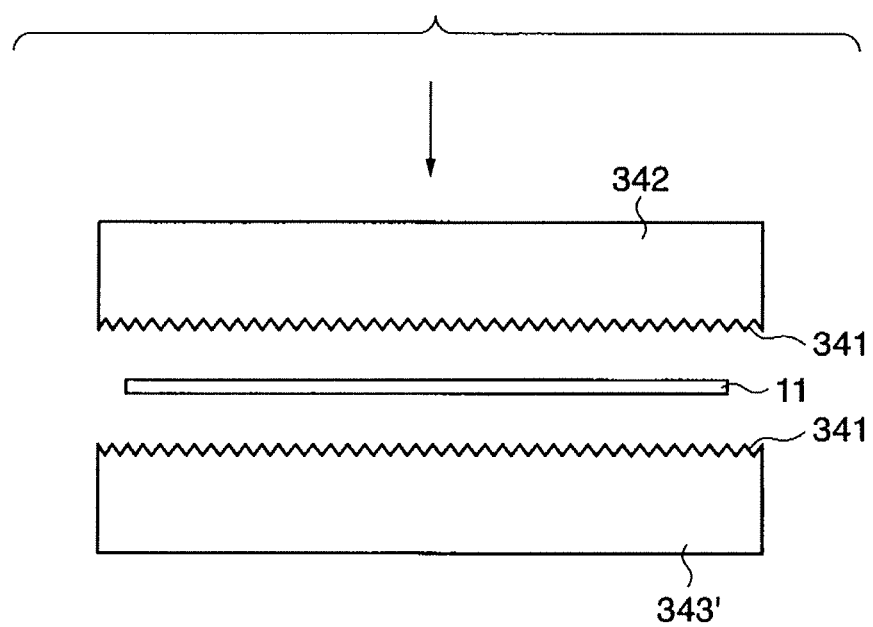

F I G. 26
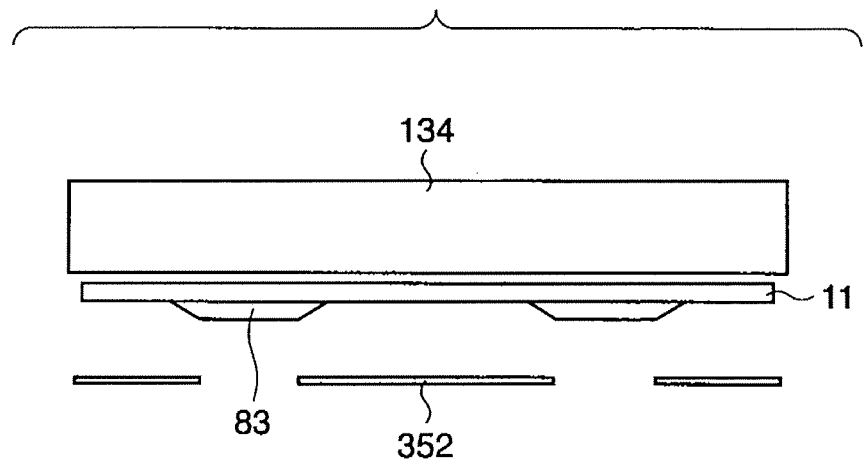

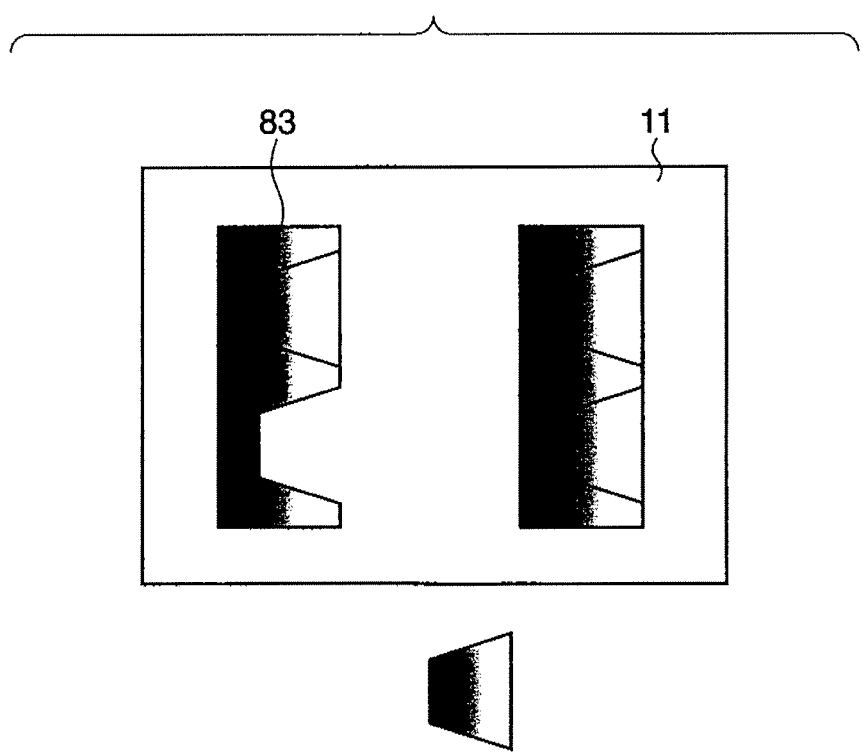
F I G. 27

NEUTRAL DENSITY OPTICAL FILTER AND IMAGE PICKUP APPARATUS

BACKGROUND OF THE INVENTION

1. Field of the Invention

The present invention relates to an optical filter and image pickup apparatus which uses an aperture device having the optical filter.

2. Description of the Related Art

An optical device such as a conventional video camera is provided with a light quantity aperture device to control an incident light quantity to a solid-state image sensor. The light quantity aperture device is controlled to decrease its aperture size when an object is bright. An ND (Neutral Density) filter is arranged in the light quantity aperture device to prevent the aperture from becoming extremely small even when the object is bright, thus preventing a hunting phenomenon or light diffraction phenomenon.

As examples of the ND filters, other than those having a single density, those having a transparent portion and a portion with a transmittance that changes continuously or stepwise are known, as shown in, e.g., Japanese Patent Laid-Open No. 6-265971 and 2004-205951.

The sensitivity and resolution of a solid-state image sensor in an optical device such as a video camera have been improving. Accordingly, if an ND filter arranged in the light quantity aperture device has a high spectral reflectance in the entire visible light wavelength range, ghost and flare tend to occur on the image pickup screen. To decrease the ghost and flare, it is important to decrease the spectral reflectance of the ND filter.

To decrease the spectral reflectance of the ND filter, a method of forming an anti-reflection film on an ND film by vacuum deposition or the like is known. Also, a method of forming an AR (Anti-Reflection) coat as an anti-reflection film on a surface where the ND film is not formed is also known. When forming an anti-reflection film comprising a single layer film on a substrate surface, however, although the reflectance can be decreased for a specific wavelength, it cannot be decreased for the other wavelengths. To cope with this situation, as shown in Japanese Patent Laid-Open Nos. 8-075902, 10-133253, and 2003-344612, suppression of the reflectance for an arbitrary wavelength range by forming several types of thin films having different refractive indices, e.g., $SiO_2$, $MgF_2$, $Nb_2O_5$, $TiO_2$, $Ta_2O_5$, $ZrO_2$, and $Al_2O_3$, is known.

When employing the ND filter as described above in the aperture device which is used in an optical device such as a video camera, the following problems remain.

More specifically, when a beam passing through an image pickup optical system including the aperture device of the camera forms an image on the surface of a solid-state image sensor, the surface of the solid-state image sensor or of a lens between the aperture device and image sensor may reflect part of the beam to return it to the aperture device. If the ND filter reflects the reflected light again so the light enters the solid-state image sensor again, ghost or flare occurs.

To prevent this, generally, the ND filter is arranged in the aperture device such that the ND film surface coated with an anti-reflection film is on the side of the solid-state image sensor. This, however, cannot prevent the reflected light from being transmitted through the ND film of the ND filter and through the substrate of the filter, and reflected by the boundary surface on the opposite side to travel toward the solid-state image sensor again. When ND films are formed on the two sides of the substrate, the reflected light cannot be prevented from being reflected by the boundary surface of the substrate and the ND film which is formed on the opposite side of the solid-state image sensor.

Moreover, the ND filter may have a transparent region on it. If a transparent anti-reflection multilayer film is used to prevent reflection by the transparent region, the material having an optimal refractive index as the multilayer film is limited, making it sometimes difficult to achieve an optimal combination. Also, in addition to the ND film, the anti-reflection film must be formed as a multilayer film, leading to an increase in number of manufacturing steps.

SUMMARY OF THE INVENTION

It is an object of the present invention to provide an optical filter in which not only the spectral reflectance on the filter surface but also the spectral reflectance on the boundary surface on the opposite side through the substrate of the filter is lowered to decrease inconveniences in an image such as flare or ghost.

It is another object of the present invention to provide an optical filter which easily provides an anti-reflection effect even when the filter has a transparent region on it.

It is still another object of the present invention to provide an image pickup apparatus in which inconveniences in an image such as flare or ghost are decreased by using an aperture device having such an optical filter.

In order to solve the above problems, according to the first aspect of the present invention, there is provided an optical filter comprising a filter which is formed by stacking a thin film on at least part of a transparent substrate. The optical filter includes a non-reflective periodic layer, in which anti-reflection structure bodies that prevent light reflection are arranged, on at least part of a surface which is opposite to a surface where the thin film is formed, the anti-reflection structure bodies being arranged at pitches with a period shorter than a wavelength of light as an anti-reflection target.

According to the second aspect of the present invention, there is provided an image pickup apparatus comprising an image sensor which photoelectrically converts an object image, an aperture member which adjusts a quantity of light entering the image sensor, and an optical filter. The optical filter comprises a filter which is arranged in an aperture formed by the aperture member and formed by stacking a thin film on at least a side of a transparent substrate which faces the image sensor. The optical filter includes a non-reflective periodic layer, in which anti-reflection structure bodies that prevent light reflection are arranged, on at least part of a surface which is opposite to a surface where the thin film is formed, and the anti-reflection structure bodies being arranged at pitches with a period shorter than a wavelength of light as an anti-reflection target.

Further features of the present invention will become apparent from the following description of exemplary embodiments with reference to the attached drawings.

BRIEF DESCRIPTION OF THE DRAWINGS

FIG. 4 is a perspective view of a fine uneven periodic structure body;

FIG. 5 is a perspective view of a fine uneven periodic structure body as a modification;

FIG. 19 is a view to explain formation of a fine uneven periodic structure by hot pressing;

FIG. 23 is a sectional schematic view of an ND filter according to the sixth embodiment;

FIG. 24 is a view to explain formation of a fine uneven periodic structure by hot pressing;

FIG. 26 is a sectional view of a deposition jig; and

FIG. 27 is a plan view of a transparent substrate on which an ND film is formed.

DESCRIPTION OF THE EMBODIMENTS

The present invention will be described in detail with reference to the embodiments shown in the accompanying drawings.

First Embodiment

Figure 1:
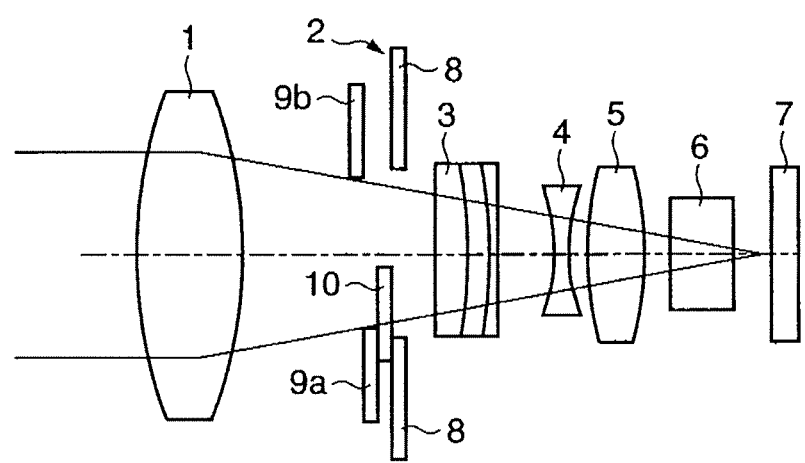
FIG. 1 is a view showing the arrangement of a photographing optical system.

FIG. 1 is a view showing the arrangement of a photographing optical system (image pickup apparatus). A lens 1, a light quantity aperture device 2, lenses 3 to 5, a low-pass filter 6, and a solid-state image sensor 7 which comprises a CCD sensor or the like and photoelectrically converts an object image are sequentially arranged. In the light quantity aperture device 2, a pair of aperture blades 9a and 9b movably attach to an aperture blade support plate 8. An ND filter 10 to decrease the quantity of light passing through an almost rhombic aperture formed by the aperture blades 9a and 9b is adhered to the aperture blade 9a.

If the ND filter 10 has a low visible light transmission density, as the density decreases, the reflectance tends to increase, and light reflected by the ND filter 10 generates inconveniences such as ghost or flare at a high possibility.

Empirically, if the ND filter 10 has a density of approximately 1.0 or less which is equivalent to a transmittance of 10% or more, inconveniences resulting from reflection may occur. If the density is 0.5 or less which is equivalent to a transmittance of about 31.6% or more, this possibility tends to greatly increase. The equation of correlation between the density (D) and transmittance (T) is $D=\text{Log}_{10}(1/T)$. Light that is transmitted through the substrate of the filter and reflected by the boundary surface with air on the opposite side largely influences this correlation.

From the above reason, the ND filter 10 having a density of 1.0 or less often requires any reflection suppressing means such as formation of an anti-reflection film, in addition to the ND film, on the rear surface of the ND film.

Figure 2:
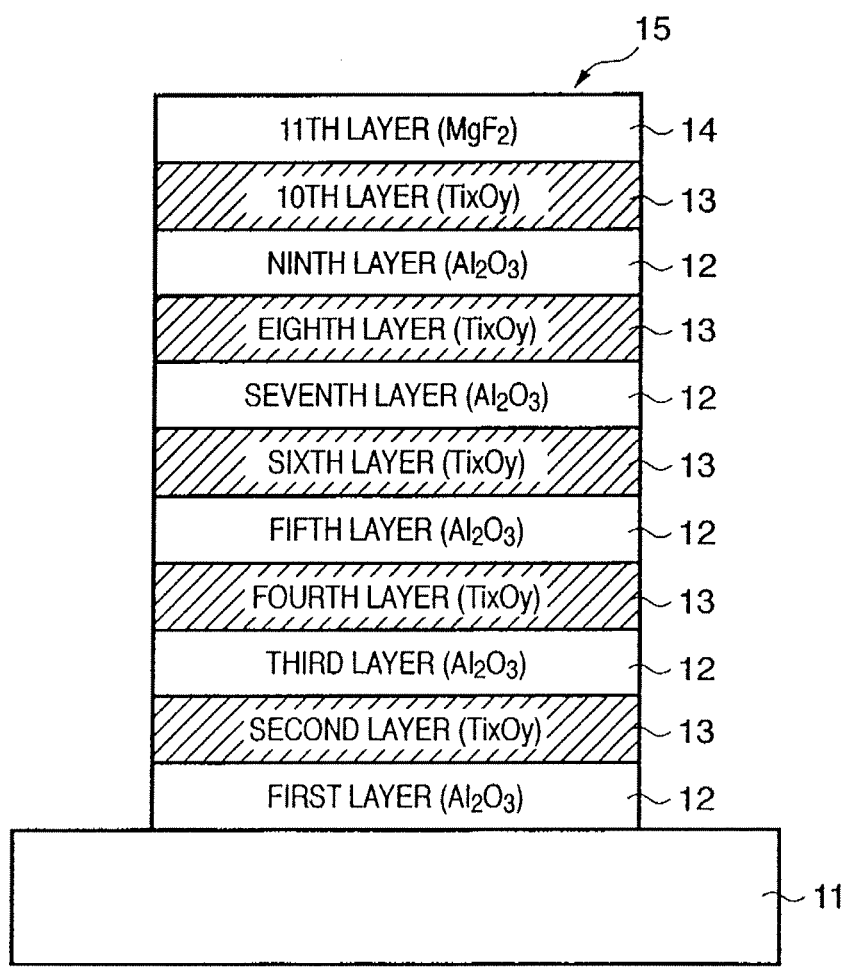
FIG. 2 is a view showing the film arrangement of an ND film.

FIG. 2 is a view showing the film arrangement of the ND film of the ND filter 10. $Al_2O_3$ films 12 comprising dielectric layers and serving as the first, third, fifth, seventh, and ninth layers, and $Ti_xO_y$ films 13 comprising metal oxides and serving as the second, fourth, sixth, eighth, and 10th layers are alternately stacked on the transparent plastic substrate 11, and an $MgF_2$ film 14 serving as an anti-reflection film is formed as the uppermost 11th layer, thus forming an ND film 15 having a total of 11 layers.

The ND film 15 is designed with sufficient consideration to problems such as the linearity of the spectral transmittance in the visible light wavelength range, the film stress which may occur because the substrate 11 employs a plastic substrate, and the thermal stress generated in the whole film formation process. The design values such as the thickness of the respective layers differ, and an arbitrary number or all of the $Al_2O_3$ films 12 may be replaced with $SiO_2$ films. With an arrangement in which $SiO_2$ films or the $Al_2O_3$ films 12 and the $Ti_xO_y$ films 13 are stacked alternately, an ND film 15 having almost similar optical characteristics can also be fabricated.

The $MgF_2$ film 14 as the uppermost layer has an optical thickness n×d (n: refractive index, d: physical film thickness) of $\lambda/4$ where $\lambda=540$ nm. The uppermost $MgF_2$ film 14 is an anti-reflection film configured to decrease the reflectance of the surface of the ND film 15, and is selected to have a refractive index n of 1.5 or less in the visible wavelength range. In this embodiment, the $MgF_2$ film 14 is used as the anti-reflection film. As the anti-reflection film 14 is mainly aimed at decreasing the reflectance, it can be made of any material as far as its refractive index is small. Even when, e.g., an $SiO_2$ film is used as the anti-reflection film, an almost similar ND film 15 can be fabricated.

As the material of the substrate 11 in this embodiment, a transparent plastic material is employed because of, e.g., the workability to an arbitrary shape. More specifically, a film is selected which is made of Arton (manufactured by JSR) as a norbornane-based resin excellent in heat resistance, flexibility, and cost as a substrate material and has a thickness of 200 μm at a portion that does not include non-reflection periodical structure bodies (to be described later).

Although Arton (manufactured by JSR) is selected in this embodiment as the material of the substrate 11, the present invention is not limited to this, but another norbornane-based resin may be used such as Zeonex or Zeonor (tradename, manufactured by Nippon Zeon). Furthermore, the substrate 11 can be selected from various types of plastic substrates made of materials other than the norbornane-based resin, e.g., PMMA, polycarbonate, PET, PEN, PC, or a PO polyimide-based resin.

Figure 3:
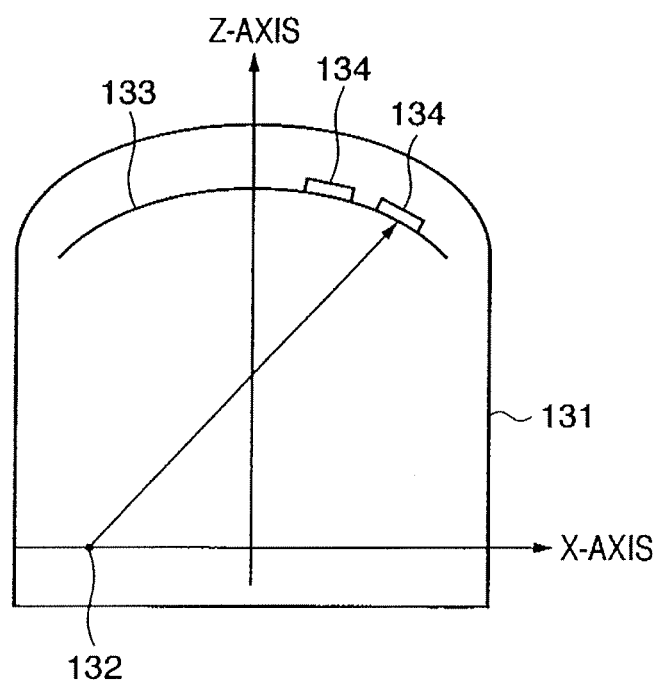
FIG. 3 is a view showing the arrangement of a chamber.

FIG. 3 is a view showing the arrangement of a chamber in a vacuum deposition machine to form the ND portion region (ND film) 15 of the ND filter 10. An evaporation source 132 and rotatable evaporation umbrella 133 are arranged in a chamber 131. The evaporation umbrella 133 is provided with substrate jigs 134 each of which has a set of a synthetic resin substrate and a mask with an opening to correspond to a film formation portion. The substrates fixing to the evaporation umbrella 133 rotate together with the evaporation umbrella 133 so films are formed on them. The deposition surface of the ND filter 10 which is to form the ND portion region 15 attaches to the evaporation umbrella 133 such that the surface of the ND filter 10 opposes the evaporation source 132. The substrate jigs 134 rotate together with the evaporation umbrella 133 about the Z-axis as the center to form films.

As an example of anti-reflection structure bodies, an SWS (sub-wavelength structure) called "Moth eye" having a periodic structure shorter than the wavelength of light is known. An improvement in micropatterning technique employed in the manufacture of a semiconductor and MEMS (Micro Electro Mechanical System) enables fabrication of the SWS. For example, a phenomenon that a moth eye is black when observed with the naked eye suggests that reflection is suppressed, and is caused because the SWS suppresses surface reflection. C. G. Bernhard discovered this fact in 1967 when he measured the reflectance of an uneven structure with a unit size of several hundred nm which was formed on the surface of a moth eye. The SWS transmits most of the intensity of incident light through its material as 0th-order diffracted light, hardly generates diffracted light other than 0-th order light, and can be formed into an arbitrary shape.

FIG. 4 is a perspective view of a conical fine uneven periodic structure 21 as one example of the SWS, which is formed on the surface for the purpose of decreasing Fresnel reflection by utilizing the characteristics of the SWS described above. In place of the fine uneven periodic structure 21, a pyramidal fine uneven periodic structure 22 as shown in FIG. 5 may be used.

Figure 6:
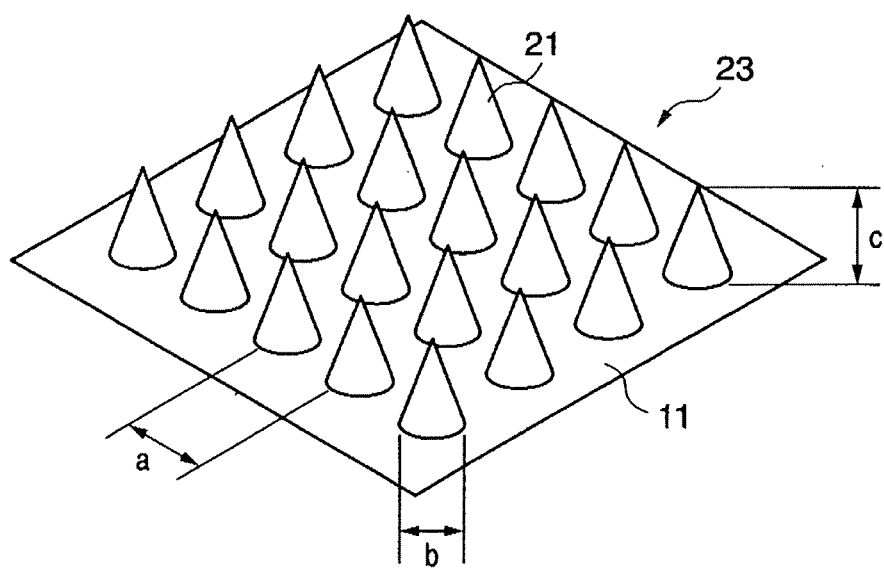
FIG. 6 is a schematic view of a fine uneven periodic structure.

FIG. 6 is a perspective view showing a case wherein a non-reflective periodic layer (fine uneven periodic structure) 23 having fine uneven periodic structure bodies comprising a moth eye structure is formed on that surface of the substrate 11 where reflection is to be suppressed. The countless conical projections 21 made of a transparent plastic material are equidistantly arranged on the surface of the substrate 11 of the ND filter 10 to provide the fine uneven periodic structure 23.

Assume that the pitch of the projections 21 is a, that the diameter of the bottom portion of the projection 21 is b, and that the height of the projection 21 is c. When taking the section of the projection 21, as the position of the section is closer to the lowest bottom portion away from the highest portion of the structure, the volume of the cut-out projection 21 increases gradually, and the corresponding effective refractive index is distributed continuously from the highest portion toward the lowest bottom portion of the projection 21. Hence, when light from above enters the conical projection 21 which has a smooth effective refractive index distribution extending from the air layer toward the substrate 11 of the ND filter 10, since no sharp refractive index change is present, the light is hardly reflected but reaches the substrate 11.

Assuming that the shortest wavelength in the wavelength range where the anti-reflection effect is to be obtained is $\lambda$ and that the refractive index of the projection 21 is ns, an anti-reflection effect can be obtained if the value of the pitch a satisfies the following equation:

$$a \leq \lambda/ns$$

Note that the diameter b represents the size of the bottom surface of the projection 21. This determines the packing of the anti-reflection elements which is preferably about 50% to 100% the pitch a.

When the aspect ratio of the height c to the pitch a is about 1.0, it can provide an anti-reflection effect. By setting the pitch a, diameter b, and height c at optimal values in this manner, the anti-reflection efficiency for a desired wavelength $\lambda$ can be increased.

Figure 7:
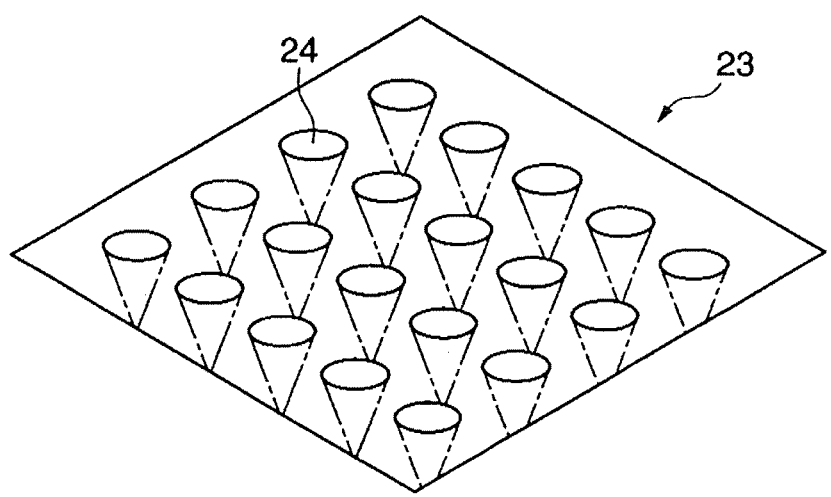
FIG. 7 is a schematic view of a fine uneven periodic structure as a modification.

Although this embodiment exemplifies the fine uneven periodic structure 23 comprising a large number of conical projections 21, the fine uneven periodic structure 23 may comprise pyramidal shapes, or inverted-conical recesses 24 as shown in FIG. 7. This can provide a distribution in which the optical refractive index of the medium before the light enters and that of the medium after the light enters can be artificially smoothly coupled, thus decreasing reflection.

Regarding the fabrication of the fine uneven periodic structure bodies 21, 22, and 24 as the anti-reflection structure bodies, in this embodiment, they are fabricated by injection molding. Injection molding is a method of packing a molten plastic material into the cavity portion of a mold comprising a male mold and female mold at a high speed and with a high pressure by a screw, quenching the mold, and extracting the resultant product from the mold, thus obtaining a molded product having a desired shape. Other methods include photopolymerization which utilizes a stamper having a regular fine uneven pattern on its surface and a film applied with a photopolymerizing resin. Also, hot pressing can be utilized by which a mold having a fine uneven pattern is heated at a temperature higher than the glass transition point of a plastic material serving as a base material and the mold is urged against the base material.

This embodiment employs the non-reflective periodic layer 23 comprising the conical fine uneven periodic structure bodies 21 as shown in FIG. 4. Considering the use of the ND filter 10 and aiming at decreasing the reflectance of the visible light wavelength range of almost $\lambda$=400 nm to 700 nm, the non-reflective periodic layer 23 is designed such that the height is 250 nm, that the period is 220 nm, and that the ratio (aspect ratio) of the height to the period is 1 or more.

Figure 8A:
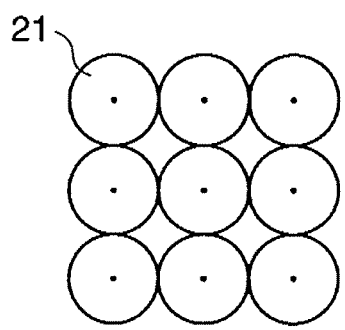
FIGS. 8A and 8B are views each to explain an arrangement example of fine uneven periodic structure bodies.
Figure 8B:
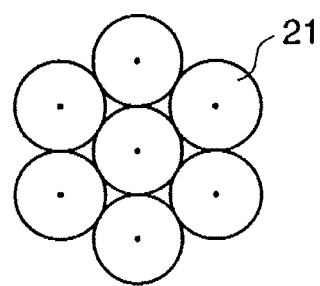

In the case of the fine uneven periodic structure body 21 shown in FIG. 4, its arrangement may include square arrangement shown in FIG. 8A, hexagonal arrangement shown in FIG. 8B, or the like. Hexagonal arrangement may have a larger anti-reflection effect because it provides a less exposed surface of the material of the substrate 11. This embodiment, however, employs square arrangement shown in FIG. 8A due to the fabrication convenience of the fine uneven periodic structure bodies 21.

Figure 9:
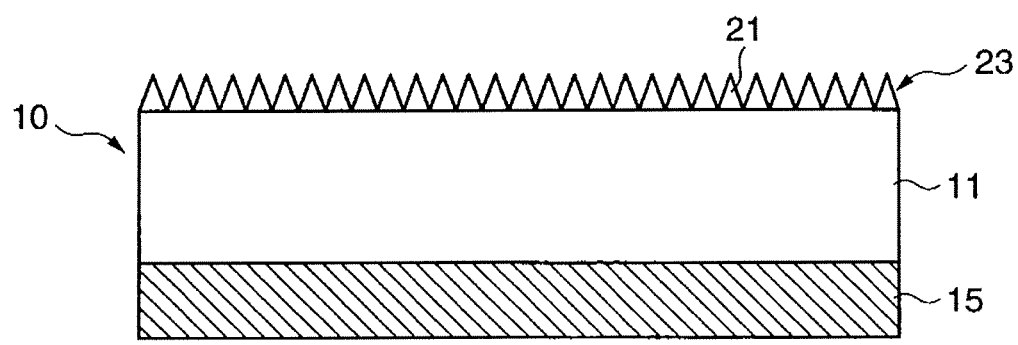
FIG. 9 is a sectional view of an ND filter having fine uneven periodic structure bodies.
Figure 10:
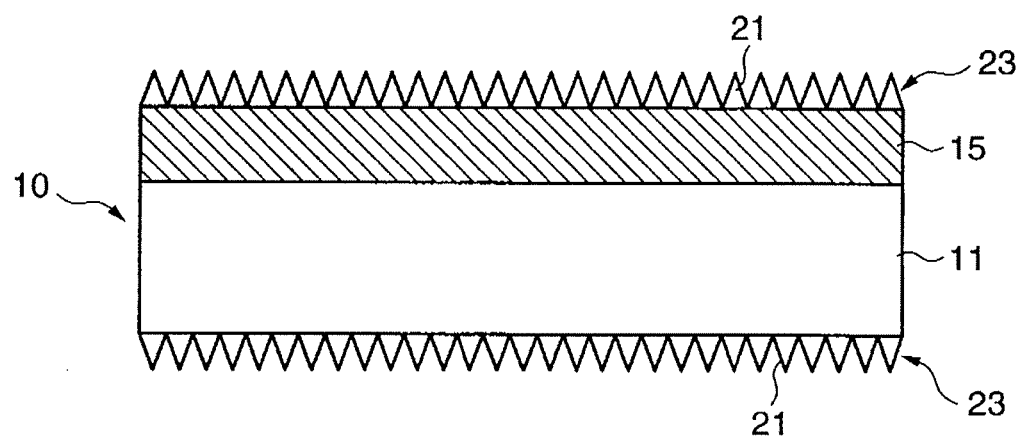
FIG. 10 is a sectional view of another ND filter having fine uneven periodic structure bodies.

FIG. 9 is a sectional view of the ND filter 10 of this embodiment. The non-reflective periodic layer 23 as described above is formed on the substrate 11. The ND film 15 is formed on the other surface of the substrate 11 by vacuum deposition. If forming a single-density-type ND film 15 having a density of 0.6 in any region of the film formation segment, the anti-reflection function can be improved. Alternatively, as in an ND filter 10 shown in FIG. 10, non-reflective periodic layers 23 can be respectively formed on the two surfaces of a substrate 11. According to this embodiment, when incorporating the ND filter 10 in the image pickup apparatus shown in FIG. 1, the ND filter 10 is arranged such that the surface of the substrate 11 where the ND film 15 is formed faces the solid-state image sensor 7.

According to this embodiment, the ND film 15 is formed on the surface of the substrate 11. However, the present invention is not limited to this. When forming an optical filter other than the ND filter 10, a target thin film may be formed, in place of the ND film 15 shown in FIG. 2, on the substrate 11.

Figure 11:
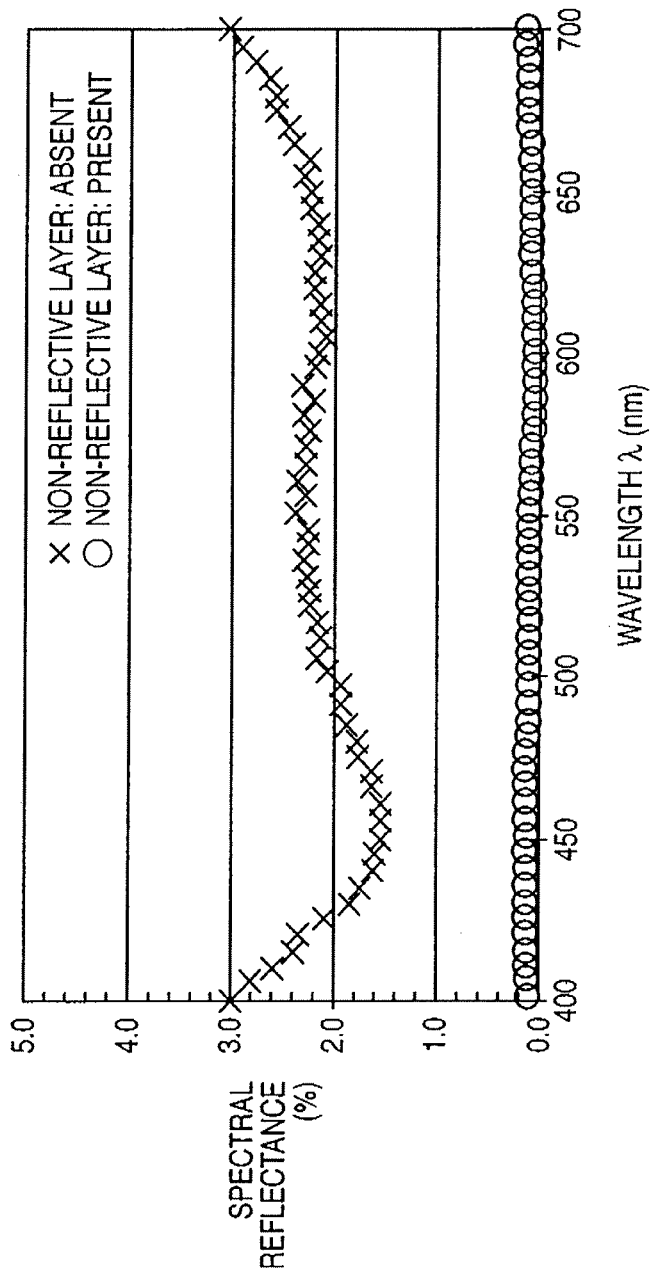
FIG. 11 is a graph of the spectral reflectance of the ND filter.

FIG. 11 is a graph of the spectral reflectance in the visible light wavelength range of the ND film 15 surface of the fabricated ND filter 10. The spectral reflectance is 0.5% or less throughout the entire visible light wavelength range. For example, when comparing the ND filter 10 of this embodiment with an ND filter having the same film arrangement but no non-reflective periodic layer 23, the spectral reflectance in the visible light wavelength range of the ND film 15 surface is about 3% at maximum. In this manner, in the ND filter 10 comprising the non-reflective periodic layer 23 according to this embodiment, the reflectance decreases greatly.

This is due to the following reason. Regarding the beam entering the ND filter 10, the $MgF_2$ film 14 of the formed ND film 15 suppresses the spectral reflectance at the boundary of the atmosphere and the ND film 15 and at the boundary of the ND film 15 and the substrate 11. The non-reflective periodic layer 23 decreases the reflectance at the boundary of the substrate 11 and the atmosphere, that is, at the beam emerging surface.

In this embodiment, the surface where the ND film 15 is formed is determined as the beam entering side (the side where light reflected by the image sensor 7 enters), and the surface where the non-reflective periodic layer 23 is formed is determined as the exit side. However, if the surface where the non-reflective periodic layer 23 is formed is determined as the entering side, the same effect can be obtained. No wrinkles or cracks are formed in the appearance, so that a good ND filter 10 can be obtained.

Figure 12:
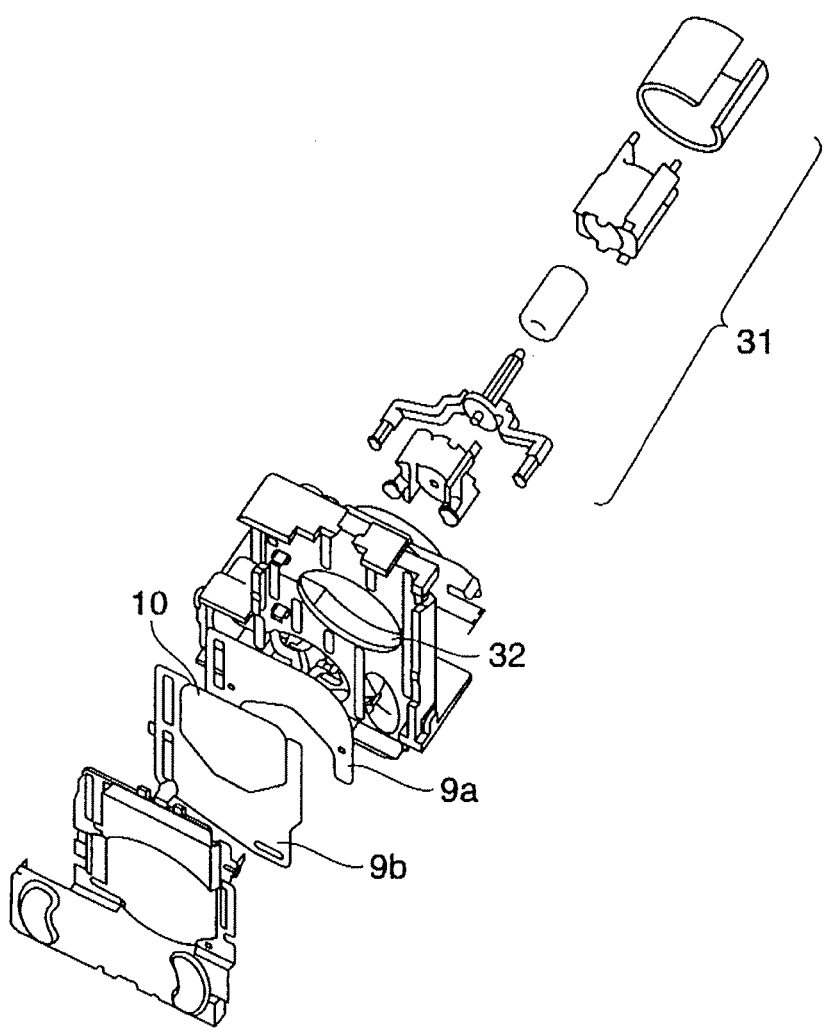
FIG. 12 is an exploded perspective view of a light quantity aperture device which uses an ND filter.

FIG. 12 is a perspective view of a light quantity aperture device which uses the ND filter 10 having such characteristics. When an aperture driver 31 drives the aperture blades 9a and 9b to move, the ND filter 10 can enter and get out of an aperture plate opening 32 freely.

According to this embodiment, the ND filter 10 attaches to the aperture blade 9a. Alternatively, the ND filter 10 may move independently of the aperture blade.

When an image pickup apparatus such as a video camera or digital still camera employs this light quantity aperture device, as shown in FIG. 1, inconveniences such as ghost or flare which are caused by the light reflected by the ND filter 10 can be decreased.

As shown in this embodiment, formation of the non-reflective periodic layer 23 on the surface on a side opposite to the ND film 15 can decrease reflection by all surfaces, thus decreasing the inconveniences such as ghost or flare which are caused by the light reflected by the ND filter 10.

Usually, the spectral reflectance of the non-reflective periodic layer 23 is lower than that of the $MgF_2$ film 14 serving as an anti-reflection film formed on the ND filter 10. Thus, if attaching the ND filter 10 such that the non-reflective periodic layer 23 side opposes the solid-state image sensor 7, in the converse manner to the conventional case, much better spectral reflectance characteristics can also be obtained.

Second Embodiment

In each of the second to fourth embodiments to be described hereinafter, an ND filter 10 comprises a transparent portion region 211 and ND portion region 212. The ND portion region 212 has the same film arrangement as that of the ND portion region 15 described in the first embodiment.

Figure 13:
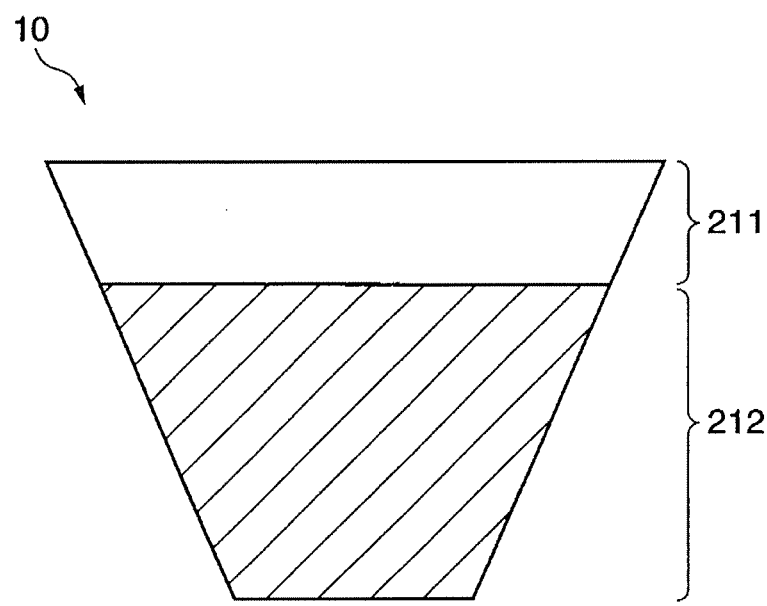
FIG. 13 is a plan view of an ND filter according to the second embodiment.

FIG. 13 is a plan view of the ND filter 10. The ND filter 10 comprises the transparent portion region 211 and the ND portion region 212 which forms an ND film and attenuates light with a predetermined proportion. Hence, when mounting the ND filter 10 of this embodiment in the light quantity aperture device 2 shown in FIG. 1, the transparent portion region 211 of the ND filter 10 is located in part of the aperture region or to cover the entire aperture region when the aperture region is open.

When driving the aperture plate to reduce the opening in accordance with the light quantity of the object, as the aperture plate is driven, the ND portion region 212 enters the aperture to gradually decrease the light quantity in accordance with the entering amount.

The transparent portion region 211 of the ND filter 10 according to this embodiment is not deposited with the ND film described in the first embodiment, and its surface has a fine uneven periodic structure 23 with a pitch shorter than the visible light wavelength. As the fine uneven periodic structure forms an anti-reflection structure, as described above, it hardly reflects light entering the surface of the transparent portion region 211.

As a method of forming such a regular fine uneven periodic structure 23, the method described in the first embodiment may be employed. In this embodiment, photopolymerization is employed. To form the fine uneven periodic structure 23 on the transparent portion region 211 of the ND filter 10, an epoxy-type ultraviolet-curing resin is applied as a photopolymerizing resin to a thickness of about 40 μm by gravure coating to the portion that forms the transparent portion region 211. A stamper having an inverted shape of the fine uneven periodic pattern is placed on the portion coated with the epoxy-type ultraviolet-curing resin. The substrate and stamper are brought into tight contact with each other, and irradiated by a high-pressure mercury lamp from the substrate side to cure, by photopolymerization, the epoxy-type ultraviolet-curing resin. After that, the substrate and stamper are separated from each other. An anti-reflection region in which the desired fine uneven periodic structure 23 is formed in the transparent portion region 211 of the ND filter 10 is thus obtained.

Using the same method as described above, a fine uneven periodic structure 23 is also formed on the rear surface of the transparent portion region 211 where the fine uneven periodic structure 23 has been formed on the front surface. Subsequently, ND films are formed by vacuum deposition on the two surfaces of the prospective ND portion region 212 portion of the substrate which has the fine uneven periodic structures 23 in the transparent portion region 211. This ND film formation is performed using the same vacuum deposition machine as that of the first embodiment shown in FIG. 3.

Figure 14:
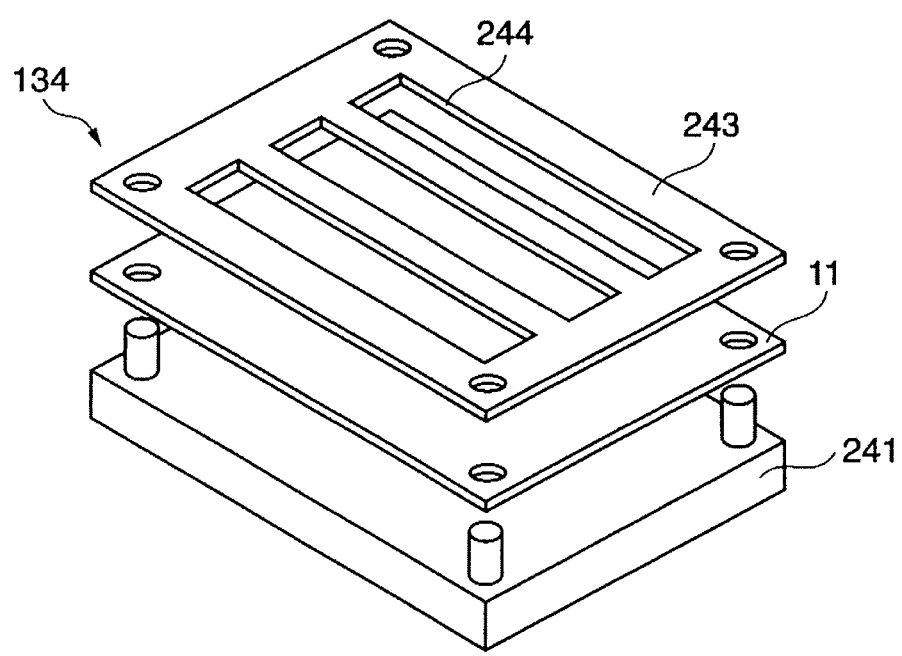
FIG. 14 is a perspective view of a deposition jig.

FIG. 14 is a perspective view of a substrate jig 134. A plastic substrate 11 which is formed of a 100-μm thick transparent PET film and which is to undergo deposition, and a mask plate 243 made of a magnetic material are placed in this order on a fixing jig 241 on which, e.g., magnets (not shown) are arranged. The mask plate 243 has openings 244 each only in a portion corresponding to the ND portion region 212 where a deposition film is to be formed. The fixing jig 241 and mask plate 243 are brought into tight contact with each other by chucking or the like to prevent any deposition film from attaching to the transparent portion region 211, so that a predetermined deposition film attaches to only the ND portion region 212.

The ND film 15 formed by the above method is a single-density film having an even density in the prospective ND portion region 212 portion, so that, more specifically, the density of each surface becomes about 0.35, that is, the density when films are formed on the two surfaces becomes 0.7.

For the purpose of comparison, a substrate 11 was prepared in which no fine uneven periodic structure 23 was formed in a prospective transparent portion region 211 portion of an ND filter 10. ND films 15 were similarly formed on the two surfaces of a prospective ND portion region 212 portion.

Each ND filter 10 having the transparent portion region 211 and ND portion region 212 fabricated by the above method was attached to the aperture blade 9a of the light quantity aperture device as shown in FIG. 12. The light quantity aperture device was mounted in an image pickup apparatus identical to a conventional one as shown in FIG. 1, and the resultant image was evaluated.

As shown in Table 1, in the ND filter 10 in which the fine uneven periodic structures 23 were formed in the transparent portion region 211, the influence of ghost decreased, and accordingly degradation in image quality was suppressed. In the ND filter 10 in which no fine uneven periodic structure 23 was formed in the transparent portion region 211, the influence of ghost could not decrease sufficiently, and accordingly degradation in image quality could not be suppressed sufficiently.

TABLE 1

| Fine Uneven Periodic Structure | Image Quality |
| --- | --- |
| Present | ○ |
| Absent | x |

Third Embodiment

Figure 15:
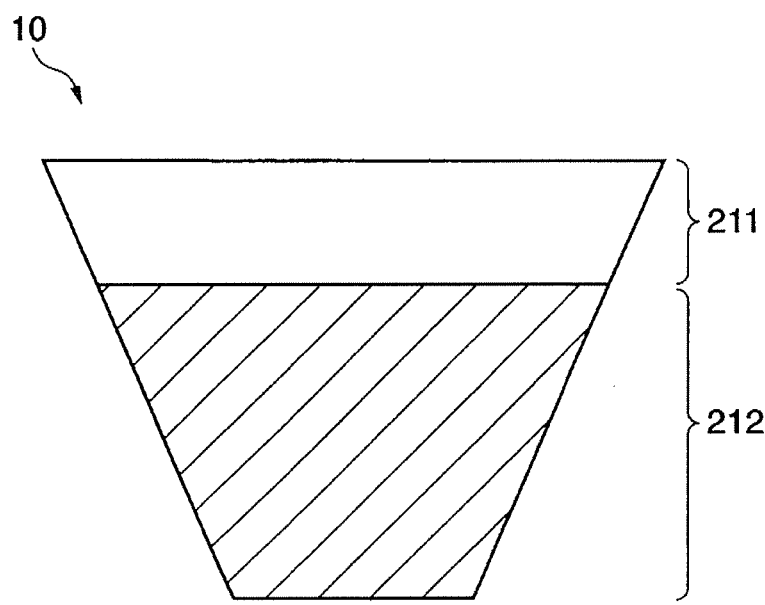
FIG. 15 is a plan view of a 2-density ND filter according to the third embodiment.
Figure 16:
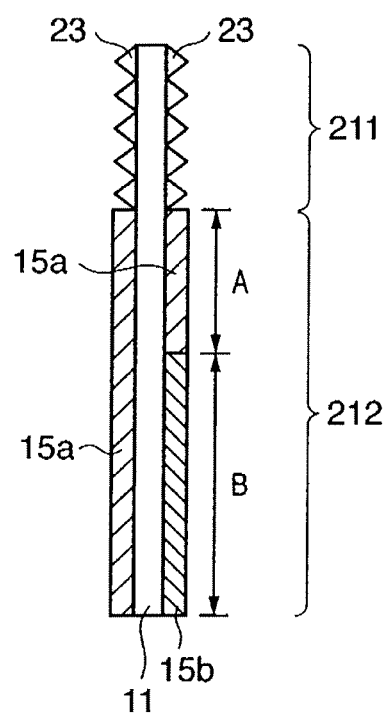
FIG. 16 is a side view of the 2-density ND filter according to the third embodiment.

FIG. 15 is a plan view of an ND filter 10 according to the third embodiment, and FIG. 16 is a side view of the same. ND films 15a and 15b having two types of densities to provide different transmission light quantities are formed in an ND portion region 212. Using a plastic substrate 11 similar to that of the second embodiment, fine uneven periodic structures 23 made of an epoxy-type ultraviolet-curing resin are respectively formed on the two surfaces of a transparent portion region 211 of the ND filter 10.

According to a deposition method of the ND films 15a and 15b, first, the ND film 15a having an 11-layer arrangement identical to that shown in FIG. 2 is deposited on the entire one surface of the ND portion region 212 to provide a density of 0.35. Subsequently, using a mask plate 243 having an opening 244, an ND film 15a having an 11-layer arrangement is deposited on the other surface in only a region A of the ND portion region 212 to provide a density of 0.35. Furthermore, using the mask plate 243 having the opening 244, the ND film 15b having an 11-layer arrangement is deposited in only a region B of the ND portion region 212 to provide a density of 1.05.

The formed ND filter 10 was controlled such that the densities of the regions A and B in the ND portion region 212 were respectively about 0.7 and 1.4.

For the purpose of comparison, a substrate 11 was prepared in which no fine uneven periodic structure 23 was formed in a prospective transparent portion region 211 portion of an ND filter 10. ND films 15a and 15b respectively having two types of different density regions were similarly formed in an ND portion region 212.

Each ND filter 10 having the transparent portion region 211 and ND portion region 212 fabricated by the above method was attached to the aperture blade 9a of the light quantity aperture device as shown in FIG. 12, in the same manner as in the second embodiment. The light quantity aperture device was then mounted in an image pickup apparatus identical to a conventional one as shown in FIG. 1, and the resultant image was evaluated.

As shown in Table 2, in the ND filter 10 in which the fine uneven periodic structures 23 were formed in the transparent portion region 211, the influence of ghost decreased, and accordingly degradation in image quality was suppressed. In the ND filter 10 in which no fine uneven periodic structure 23 was formed in the transparent portion region 211, the influence of ghost could not decrease sufficiently, and accordingly degradation in image quality could not be suppressed sufficiently.

TABLE 2

| Fine Uneven Periodic Structure | Image Quality |
| --- | --- |
| Present | ○ |
| Absent | x |

Fourth Embodiment

Figure 17:
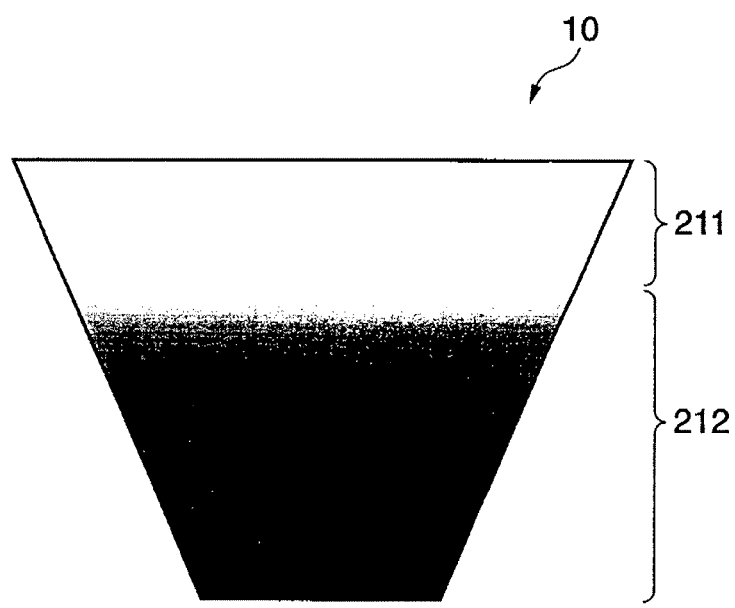
FIG. 17 is a plan view of a gradient ND filter according to the fourth embodiment.
Figure 18:
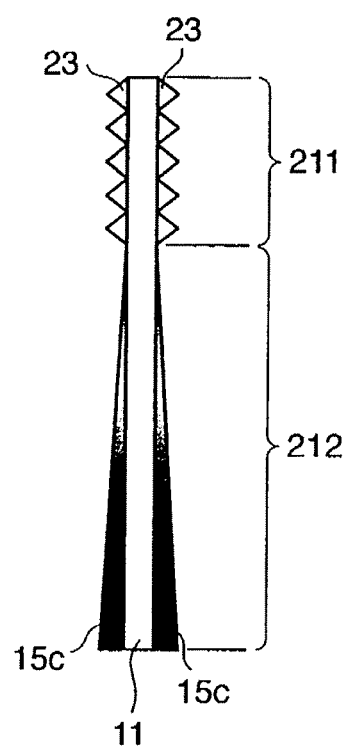
FIG. 18 is a side view of the gradient ND filter according to the fourth embodiment.

FIG. 17 is a plan view of an ND filter 10 according to the fourth embodiment, and FIG. 18 is a side view of the same. ND films 15c, each having a gradient density that the visible light transmission density changes gradually, are formed in an ND portion region 212. First, fine uneven periodic structures 23 each made of an epoxy-type ultraviolet-curing resin are respectively formed on the two surfaces of a transparent portion region 211 of the ND filter 10 using the same method as in the second and third embodiments.

The ND films 15c, each having the gradient density that the visible light transmission density changes from small to large sequentially, are respectively formed on the two surfaces of the ND portion region 212 of the ND filter 10 by vacuum deposition. To form the ND films 15c each having the gradient density, a mask having a shield plate the angle of which with respect to the mask surface is adjustable is used. A method of shielding part of the film material from the deposition surface with the mask, so as to form a gradient density distribution on a substrate 11, was employed to form the ND films 15c.

More specifically, the ND films 15c each having a density of about 0.2 to 0.6, that is, the transmittance of each of which sequentially changed from about 63% to 25%, were respectively formed on the two surfaces of the substrate 11, so the density after formation of the ND films 15c sequentially changed from about 0.4 to 1.2, that is, the transmittance sequentially changed from about 40% to 6.3%. Note that the uppermost $MgF_2$ layer was deposited on the entire ND portion region 212, without using a mask, to have an optical thickness n×d (n: refractive index; d: physical film thickness) of $\lambda/4$ ($\lambda$=500 nm to 600 nm).

For the purpose of comparison, a substrate 11 was prepared in which no fine uneven periodic structure 23 was formed in a prospective transparent portion region 211 portion of an ND filter 10. ND films 15c each having a gradient density were similarly formed in an ND portion region 212.

Each ND filter 10 having the transparent portion region 211 and ND portion region 212 fabricated by the above method was attached to the aperture blade 9a of the light quantity aperture device as shown in FIG. 12, in the same manner as in the second and third embodiments. The light quantity aperture device was then mounted in an image pickup apparatus identical to a conventional one as shown in FIG. 1, and the resultant image was evaluated.

As shown in Table 3, in the ND filter 10 in which the fine uneven periodic structures 23 were formed in the transparent portion region 211, the influence of ghost decreased, and accordingly degradation in image quality was suppressed. In the ND filter 10 in which no fine uneven periodic structure 23 was formed in the transparent portion region 211, the influence of ghost could not decrease sufficiently, and accordingly degradation in image quality could not be suppressed sufficiently.

TABLE 3

| Fine Uneven Periodic Structure | Image Quality |
| --- | --- |
| Present | ○ |
| Absent | × |

In the fourth embodiment, the transparent portion region 211 and ND portion region 212 can decrease the reflected light, generated on the surface of the ND filter 10, with the above method. As a result, ghost can be removed well.

In this manner, formation of the fine uneven periodic structures 23, in the transparent portion region 211 on a surface other than the surface where the ND film 15 is formed, can suppress stray light from reaching the solid-state image sensor 7 in FIG. 1, to decrease inconveniences caused by the reflected light of the ND filter 10 such as ghost or flare.

Usually, the spectral reflectance of the fine uneven periodic structure 23 is lower than that of the anti-reflection film formed on the ND filter 10. Thus, if attaching the ND filter 10 such that the fine uneven periodic structure 23 side opposes the solid-state image sensor 7, in the converse manner to the conventional case, much better spectral reflectance characteristics can also be obtained.

Fifth Embodiment

The following fifth to seventh embodiments exemplify an ND filter 10 having a fine uneven periodic structure 23 under an ND film 15.

As a method of forming the fine uneven periodic structure 23, various types of methods described in the above embodiments can be employed. The fifth embodiment employs hot pressing. According to the fifth embodiment, as shown in FIG. 19, an upper mold 342 having fine uneven periodic grooves 341 which are of an inverted shape to the fine uneven periodic structure 23, and a lower mold 343 having a flat surface are used to transfer the fine uneven periodic grooves 341 onto a transparent substrate 11 by hot pressing. The fine uneven periodic grooves 341 of the upper mold 342 can be formed by, e.g., forming a resist pattern on a mold base material by electron beam drawing and etching the base material by reactive ion etching.

Figure 20:
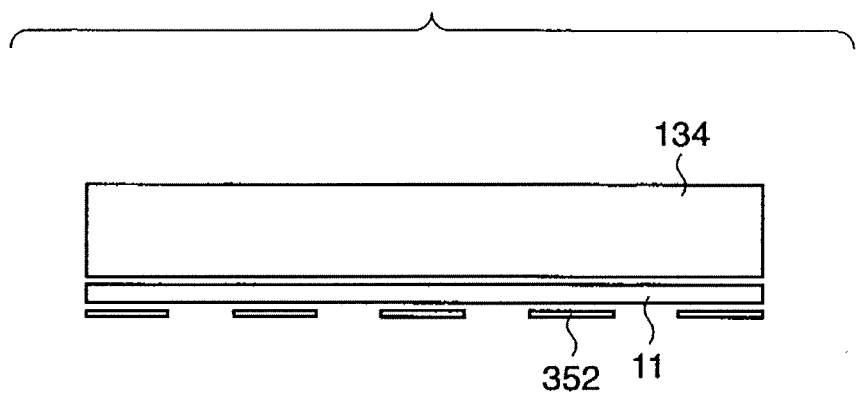
FIG. 20 is a sectional view of a deposition jig.

After that, an ND film is formed on the fine uneven periodic structure 23. FIG. 20 is a sectional view of a deposition jig 134. The transparent substrate 11 and a deposition pattern formation mask 352 fix to the deposition jig 134 with pins or the like.

Using the vacuum deposition machine shown in FIG. 3 and this deposition jig, the ND film is deposited on the substrate 11 in the same manner as in the first embodiment.

Figure 21:
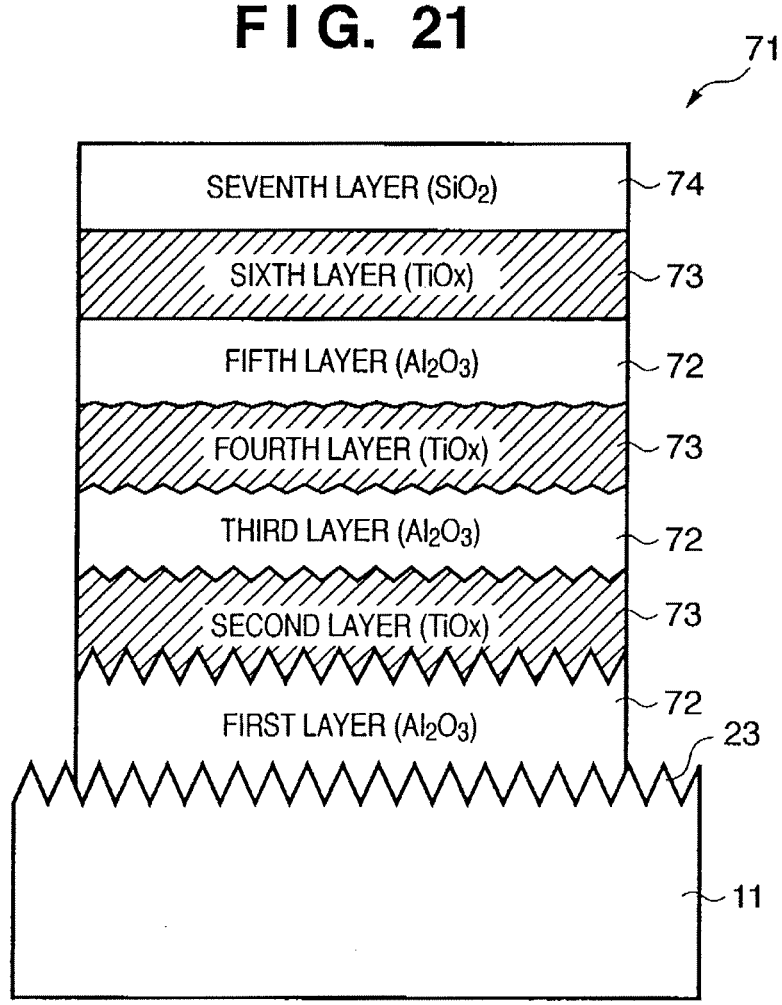
FIG. 21 is a view showing the film arrangement of an ND film.

FIG. 21 is a view showing the film arrangement of an ND film 71 as an inorganic hard film which is formed on the fine uneven periodic structure 23 by the above method and has a density of 1.0 (transmittance: 10%). $Al_2O_3$ films 72 comprising anti-reflection films to decrease the reflectance and serving as the first, third, and fifth layers, and $TiO_x$ films 73 comprising light absorption layers to decrease the transmittance and serving as the second, fourth, and sixth layers are alternately stacked on the fine uneven periodic structure 23 on the transparent substrate 11. To enhance the anti-reflection effect, an $SiO_2$ film 74 made of a low-refraction material is deposited as the uppermost seventh layer to have an optical thickness n×d (n: refractive index, d: physical film thickness) of λ/4 (λ=500 nm to 600 nm). Thus, the ND film 71 has a seven-layer arrangement. In place of the $SiO_2$ film 74, an $MgF_2$ film may be used.

As the anti-reflection films, transparent dielectric can be used, and other than the $Al_2O_3$ films 72, $SiO_2$, SiO, $MgF_2$, $ZrO_2$, or $TiO_2$ films can be used. To form the light absorption layers, a material that absorbs a wavelength in the visible wavelength range can be used. Other than the $TiO_x$ films 73, films made of a metal, an alloy, or an oxide of Ti, Ni, Cr, NiCr, NiFe, Nb, or the like can be used.

The unevenness of the fine uneven periodic structure 23 is transferred to the deposition films of the ND film 71 up to about second or third layer. Beyond the second or third layer, the unevenness is gradually smoothed. Accordingly, several layers close to the fine uneven periodic structure 23 form a boundary surface that allows expectation for an anti-reflection effect similar to that of the fine uneven periodic structure 23. This boundary surface does not particularly adversely affect the characteristics as the ND film 71.

Figure 22A:
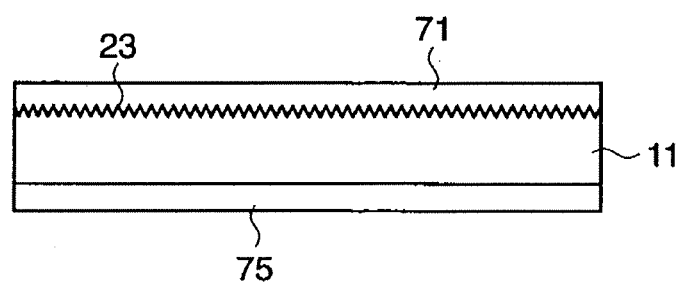
FIGS. 22A and 22B are schematic sectional views of ND filters, respectively.
Figure 22B:
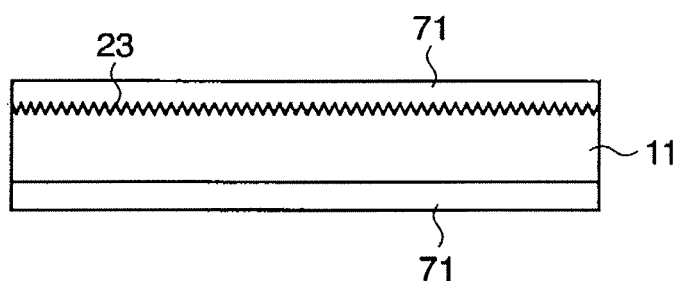

Furthermore, as shown in FIG. 22A, an $SiO_2$ single-layer film may be deposited as an anti-reflection film 75 on the rear surface to a thickness of λ/4 (λ=540 nm). Alternatively, as shown in FIG. 22B, an ND film 71 may be deposited on the rear surface as well. After film formation on the rear surface is completed, the transparent substrate 11 is extracted from the vacuum deposition machine, and a plurality of ND filters 10 formed on the transparent substrate 11 are pressed into the individual shapes.

Each ND filter 10 fabricated in the above manner was attached to the aperture blade of the light quantity aperture device, and the captured image was evaluated. As shown in Table 4, in the ND filter 10 in which the fine uneven periodic structure 23 was formed on the transparent substrate 11, the reflectance decreased, and no ghost was observed. In the ND filter 10 in which no fine uneven periodic structure 23 was formed, ghost was observed.

TABLE 4

| Fine Uneven Periodic Structure | Ghost | Maximal Reflectance (λ = 400 nm to 700 nm) |
| --- | --- | --- |
| Present | Not observed | 2% |
| Absent | Observed | 6% |

Sixth Embodiment

In the sixth embodiment, an ND filter 10, in which ND films 71 are formed on fine uneven periodic structures 23 respectively formed on the two surfaces of a transparent substrate 11 shown in FIG. 23, is to be fabricated. To form the transparent substrate 11, a 100-μm thick PET resin film is used in the same manner as in the fifth embodiment, and an upper mold 342 and lower mold 343', each of which has fine uneven periodic grooves 341 as shown in FIG. 24, are employed. The fine uneven periodic grooves 341 of the upper and lower molds 342 and 343' are transferred to the two surfaces of the transparent substrate 11 by hot pressing under the same conditions for the temperature and pressure as those in the fifth embodiment.

The transparent substrate 11 having the fine uneven fine uneven periodic structures 23 on its two surfaces was employed. The 0.3-density ND films 71 were respectively formed on the fine uneven periodic structures 23 on the two surfaces of the transparent substrate 11 by the method described above, to form the 0.6-density (transmittance: 25%) ND filter 10. The method of forming the ND films 71 according to the sixth embodiment is the same as that of the fifth embodiment.

Each ND filter 10 fabricated in the above manner was attached to the aperture blade of the light quantity aperture device, and the captured image was evaluated. As shown in Table 5, in the ND filter 10 in which the fine uneven periodic structures 23 were formed on the transparent substrate 11, the reflectance decreased, and no ghost was observed. In the ND filter 10 in which no fine uneven periodic structure 23 was formed, slight ghost was observed.

TABLE 5

| Fine Uneven Periodic Structure | Ghost | Maximal Reflectance ($\lambda$ = 400 nm to 700 nm) |
|---|---|---|
| Present | Not observed | 1% |
| Absent | Observed (slight) | 4% |

Seventh Embodiment

Figure 25:
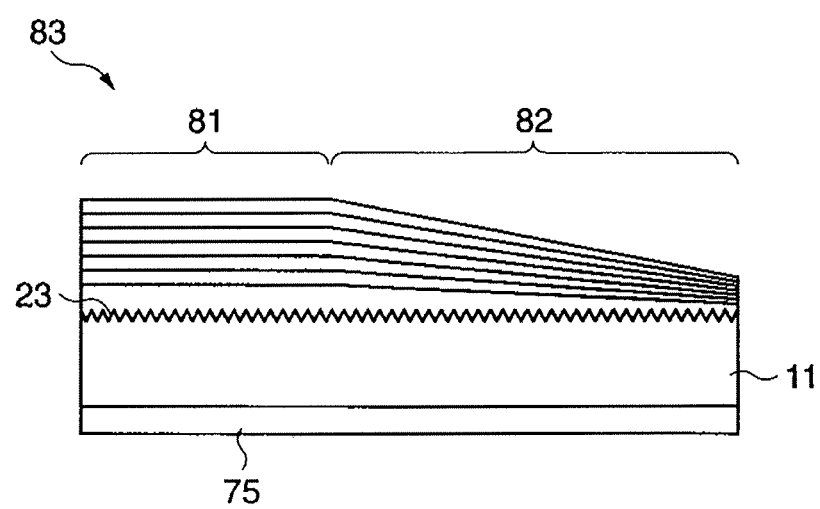
FIG. 25 is a sectional schematic view of an ND filter according to the seventh embodiment.

According to the seventh embodiment, after forming a fine uneven periodic structure 23 on a transparent substrate 11 with the same procedure as that of the fifth embodiment, an ND film 83 having a 1.0-density (transmittance: 10%) even density portion 81 and gradient density portion 82 and serving as an inorganic hard film is formed on the fine uneven periodic structure 23, as shown in FIG. 25.

As shown in FIG. 26, a deposition pattern formation mask 352 is set on the deposition jig 134 at a predetermined gap from the transparent substrate 11, and deposition is performed in the vacuum deposition machine. The deposition jig 134 undergoes film formation in the chamber 131 while rotating about the Z-axis as the center, as shown in shown in FIG. 3, so that the ND film 83 which has a gradient density distribution as shown in FIG. 27 can be formed.

The ND film 83 has the gradient density portion 82 where the film thickness decreases gradually. In the gradient density portion 82, the thicknesses of the respective layers differ at different positions. Usually, in the ND filter 10 having such a gradient density portion 82, even if the even density portion 81 suppresses reflection, as the thicknesses change in the gradient density portion 82, reflection becomes large at some positions. This is because reflection is totally suppressed utilizing interference of light reflected by the respective layers. In the seventh embodiment, the fine uneven periodic structure 23 formed on the surface of the transparent substrate 11 imparts gradients to the refractive indices of the interfaces of the respective layers so as to suppress reflection. This can suppress an increase in reflectance depending on the position.

On the rear surface of the substrate 11 where the ND film 83 is formed, an SiO$_2$ single-layer film is formed by deposition to $\lambda/4$ ($\lambda$=540 nm) as an anti-reflection film 75. After formation of the anti-reflection film 75 on the rear surface is completed, the transparent substrate 11 is extracted from the vacuum deposition machine, and a plurality of ND filters 10 formed on the transparent substrate 11 are pressed into the individual outer shapes.

Each ND filter 10 fabricated in the above manner was attached to the aperture blade of the light quantity aperture device, and the captured image was evaluated. Table 6 shows the evaluation. In the ND filter 10 in which the fine uneven periodic structure 23 was formed on the substrate 11, the reflectance decreased, and no ghost was observed. In the ND filter 10 in which no fine uneven periodic structure 23 was formed, ghost was observed.

TABLE 6

| Fine Uneven Periodic Structure | Ghost | Maximal Reflectance ($\lambda$ = 400 nm to 700 nm) |
|---|---|---|
| Present | Not observed | 4% |
| Absent | Observed | 15% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-233039 filed Aug. 30, 2006, No. 2006-245343 filed September 11, and No. 2006-257198 filed Sep. 22, 2006, which are hereby incorporated by reference herein in their entirety.

What is claimed is:

1. A neutral density ("ND") filter comprising:
   a filter formed by stacking a multi-layered thin film, as a first ND film, on at least part of a surface of a transparent substrate;
   a periodic reflection suppression layer, in which anti-reflection structure bodies that reduce light reflection are arranged on at least part of a surface of the transparent substrate opposite to the surface where the multi-layered thin film is formed; and
   a second ND film uniformly formed on the periodic reflection suppression layer by alternately stacking light absorption films and dielectric films, wherein an anti-reflection film is formed on a surface of the second ND film,
   wherein the anti-reflection structure bodies are arranged at pitches with a period shorter than a wavelength of light as an anti-reflection target.

2. The ND filter according to claim 1, wherein the ND filter has a density with a maximal value of not more than 1.0 in a visible light wavelength range.

3. An image pickup apparatus comprising:
   an image sensor which photoelectrically converts an object image;
   an aperture member which adjusts a quantity of light entering the image sensor; and
   a neutral density ("ND") filter comprising:
   a filter which is arranged in an aperture formed by the aperture member, and formed by stacking a multi-layered thin film, as a first ND film, on a side of a transparent substrate,
   a periodic reflection suppression layer, in which anti-reflection structure bodies that reduce light reflection are arranged on a side of the transparent substrate which is opposite to the side where the multi-layered thin film is formed, and
   a second ND film uniformly formed on the periodic reflection suppression layer by alternately stacking light absorption films and dielectric films, wherein an anti-reflection film is formed on a surface of the second ND film,
   wherein the anti-reflection structure bodies are arranged at pitches with a period shorter than a wavelength of light as an anti-reflection target.

4. The apparatus according to claim 3, wherein the ND filter has a density with a maximal value of not more than 1.0 in a visible light wavelength range.

5. The apparatus according to claim 3, wherein the multi-layered thin film is stacked on a side of the transparent substrate which faces the image sensor.

6. A neutral density ("ND") filter comprising:
- an anti-reflection film formed on at least part of a surface of a transparent substrate;
- a periodic reflection suppression layer, in which anti-reflection structure bodies that reduce light reflection are arranged on at least part of a surface of the transparent substrate opposite to the surface where the anti-reflection film is formed, and
- an ND film uniformly formed on the periodic reflection suppression layer by alternately stacking light absorption films and dielectric films, wherein an anti-reflection film is formed on a surface of the ND film, wherein the anti-reflection structure bodies are arranged at pitches with a period shorter than a wavelength of light as an anti-reflection target.

\* \* \* \* \*